US012628077B2

(12) United States Patent
Dixit

(10) Patent No.: US 12,628,077 B2
(45) Date of Patent: May 12, 2026

(54) SYSTEMS AND METHODS FOR SAVING ENERGY IN A NETWORK

(71) Applicant: JIO PLATFORMS LIMITED, Ahmedabad (IN)

(72) Inventor: Vikas Dixit, Bengaluru (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 504 days.

(21) Appl. No.: 18/246,355

(22) PCT Filed: Jul. 28, 2022

(86) PCT No.: PCT/IB2022/056985
§ 371 (c)(1),
(2) Date: Mar. 23, 2023

(87) PCT Pub. No.: WO2023/007417
PCT Pub. Date: Feb. 2, 2023

(65) Prior Publication Data
US 2023/0362809 A1    Nov. 9, 2023

(30) Foreign Application Priority Data

Jul. 29, 2021    (IN) .............................. 202121034067

(51) Int. Cl.
*H04W 52/02*    (2009.01)
*H04W 24/10*    (2009.01)
(52) U.S. Cl.
CPC ....... *H04W 52/0206* (2013.01); *H04W 24/10* (2013.01)
(58) Field of Classification Search
None
See application file for complete search history.

(56) References Cited

U.S. PATENT DOCUMENTS 11,057,129 B2    7/2021   Bedekar
2007/0061435 A1*  3/2007   Di Cristofano ........... G06F 1/18
                                              709/223

(Continued)

FOREIGN PATENT DOCUMENTS

CN        105814950 B     12/2019
EP          2665312 B1     6/2014

OTHER PUBLICATIONS

International Search Report from International Appl. No. PCT/IB2022/056985, mailed Nov. 9, 2022.

*Primary Examiner* — Adnan Baig

(74) *Attorney, Agent, or Firm* — FINNEGAN, HENDERSON, FARABOW, GARRETT & DUNNER, LLP

(57)    ABSTRACT

Present disclosure generally relates to energy saving technology, and more particularly relates to systems and methods for saving energy using r-Apps (112) and x-Apps (114B) in an Open Radio Access Network (O-RAN). The user (128) via first computing device (124) may input initial energy saving policies to "energy saving" r-Apps (112) which creates policies to start measurements in NR capacity booster cells and candidate cell. The r-Apps acts on various inputs and may decide to move NR booster cell into energy saving mode. Once all the mobile devices move to other cells, the NR capacity cell may move to energy saving mode. The r-Apps decide to de-activate energy saving mode. The Service Management and Orchestration (SMO) device (108) de-activate energy saving mode on capacity booster cell using O1 interface.

20 Claims, 9 Drawing Sheets

(56) References Cited

U.S. PATENT DOCUMENTS

| | | | | |
|---|---|---|---|---|
| 2015/0067139 | A1* | 3/2015 | Malnati .............. | G06F 11/0748 |
| | | | | 709/224 |
| 2017/0041870 | A1* | 2/2017 | Chen ................. | H04W 52/0206 |
| 2019/0261267 | A1* | 8/2019 | Mackenzie ....... | H04W 52/0206 |
| 2019/0392137 | A1* | 12/2019 | Beskrovny ........... | G06F 21/554 |
| 2020/0329428 | A1* | 10/2020 | Chou ................... | H04W 36/22 |
| 2021/0235277 | A1* | 7/2021 | Parekh ................. | H04W 16/14 |
| 2021/0235473 | A1* | 7/2021 | Parekh .............. | H04W 72/542 |
| 2022/0167182 | A1* | 5/2022 | Ramamurthi ......... | H04W 24/02 |
| 2022/0174589 | A1* | 6/2022 | Bellamkonda ....... | H04B 7/0617 |
| 2022/0210706 | A1* | 6/2022 | Parekh ............. | H04W 36/0085 |

* cited by examiner

150 ⟍

Figure 2:
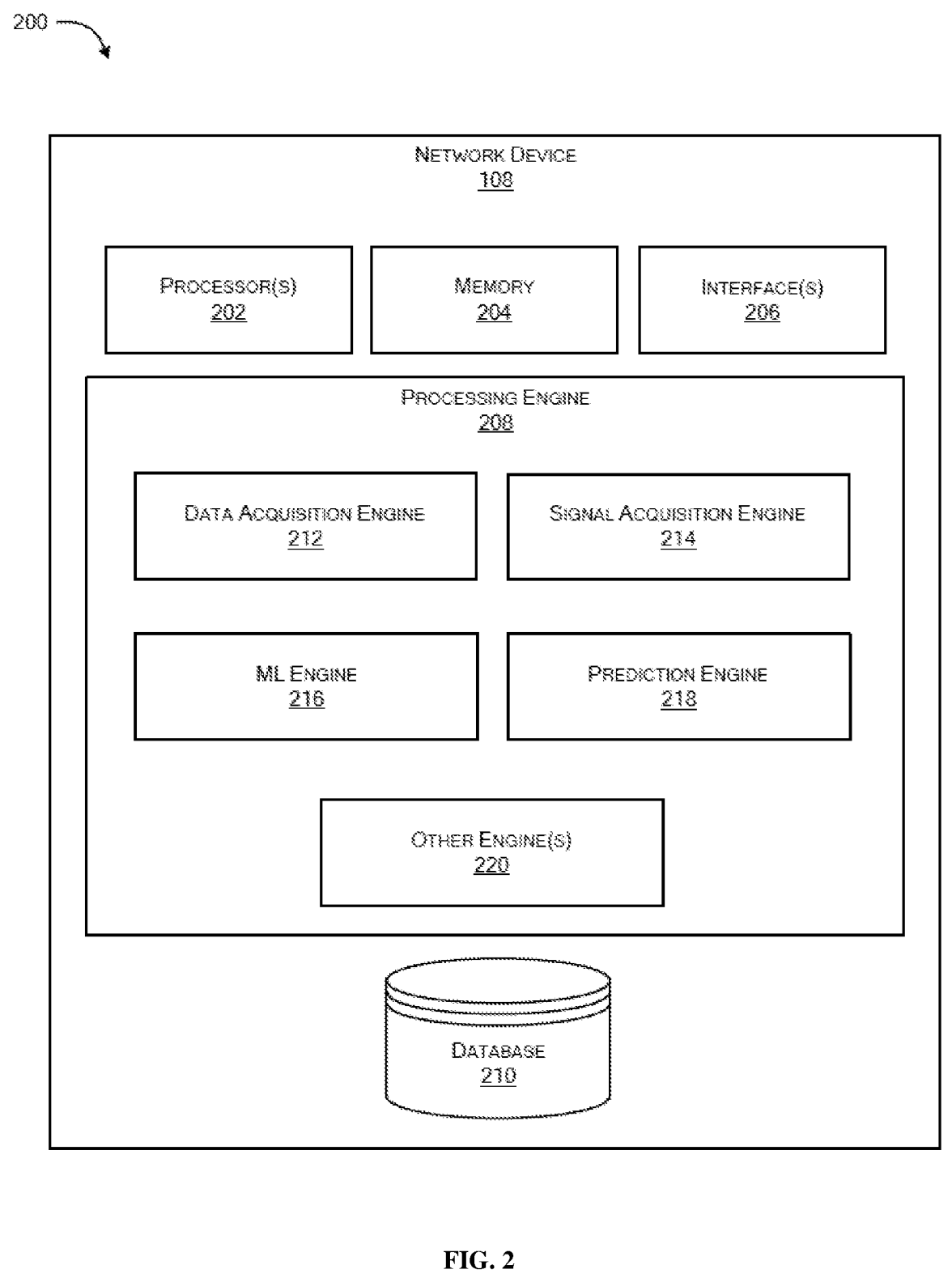

200

NETWORK DEVICE
108

| PROCESSOR(S) 202 | MEMORY 204 | INTERFACE(S) 206 |

PROCESSING ENGINE
208

| DATA ACQUISITION ENGINE 212 | SIGNAL ACQUISITION ENGINE 214 |

| ML ENGINE 216 | PREDICTION ENGINE 218 |

OTHER ENGINE(S)
220

DATABASE
210

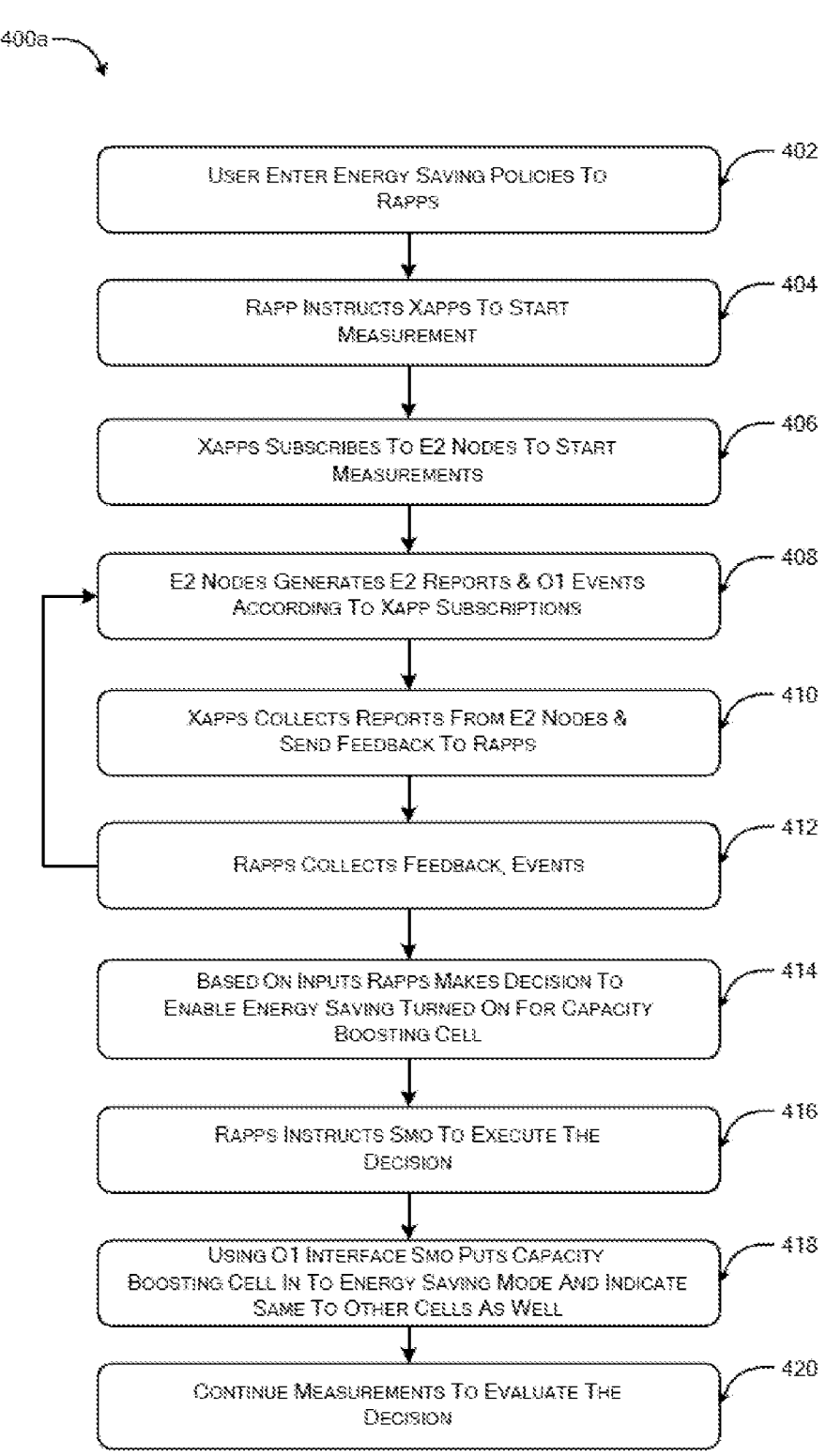

400a

402 — USER ENTER ENERGY SAVING POLICIES TO RAPPS

404 — RAPP INSTRUCTS XAPPS TO START MEASUREMENT

406 — XAPPS SUBSCRIBES TO E2 NODES TO START MEASUREMENTS

408 — E2 NODES GENERATES E2 REPORTS & O1 EVENTS ACCORDING TO XAPP SUBSCRIPTIONS

410 — XAPPS COLLECTS REPORTS FROM E2 NODES & SEND FEEDBACK TO RAPPS

412 — RAPPS COLLECTS FEEDBACK, EVENTS

414 — BASED ON INPUTS RAPPS MAKES DECISION TO ENABLE ENERGY SAVING TURNED ON FOR CAPACITY BOOSTING CELL

416 — RAPPS INSTRUCTS SMO TO EXECUTE THE DECISION

418 — USING O1 INTERFACE SMO PUTS CAPACITY BOOSTING CELL IN TO ENERGY SAVING MODE AND INDICATE SAME TO OTHER CELLS AS WELL

420 — CONTINUE MEASUREMENTS TO EVALUATE THE DECISION

FIG. 4A

RAPP COLLECTS MEASUREMENT DATA, A1 FEEDBACK AND ML MODULE DATA — 422

RAPP MAKES DECISION TO DE-ACTIVATE ENERGY SAVING MODE — 424

RAPP ASK SMO TO EXECUTE THE DECISION — 426

SMO DE-ACTIVATE ENERGY SAVING MODE ON CAPACITY BOOSTER CELL USING O1 INTERFACE — 428

SMO INFORM OTHER NEIGHBORING CELLS AS WELL — 430

SYSTEMS AND METHODS FOR SAVING ENERGY IN A NETWORK

FIELD OF INVENTION

The embodiments of the present disclosure generally relate to energy saving technology. More particularly, the present disclosure relates to systems and methods for saving energy using r-Apps and x-Apps in an Open Radio Access Network (O-RAN).

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, Third Generation Partnership Project (3GPP) may be in a process of defining energy saving features for Next Generation Node Bs (gNBs). According to 3GPP a cell or a network element or network function may be on one of these two states such as not-energy-saving state and energy-saving state, with respect to energy saving. When the cell is in energy saving state, the cell may need candidate cells to pick up the load. However, the cell in energy-saving state should not cause coverage holes or create undue load on the surrounding cells. Further, all traffic on the respective cell may be expected to be drained to other overlaid/umbrella candidate cells before the cell moves to energy-saving state. One typical scenario of energy saving is to switch off capacity booster cells when the traffic demand is low, and re-activated them on a need basis. The energy saving consists of two scenarios where the capacity booster cell gNB is fully or partially overlaid by the candidate cell(s). Further, energy saving activation procedure and energy saving deactivation procedure may be initiated in different ways such as centralized energy saving solution and distributed energy saving solution.

Currently, energy saving methods provide basic tool to move a cell or a network element or network function in to either not-energy-saving state or energy-saving state. However, current energy saving methods may not have the capability to learn dynamic behaviour of network and adapt according to the dynamic behaviour of network. Energy consumption is one of major contribution of Operating Expenditures (OPEX) for network operators to operate a network. Further, introduction of Fifth Generation (5G) may have more gNBs for coverage and capacity requirement, This may further increase the energy consumption of future network deployments. Further, the network operators may aim at decreasing power consumption in 5G networks to lower their operational expense with energy saving management solutions. With the upcoming deployment of large number of gNBs, e.g., small base stations with massive Multiple Input Multiple Output (MIMO) in high-band, energy saving may need to be expedited and which in turn may be challenging. Management of 5G networks may contribute to energy saving by reducing energy consumption of 5G networks, while maintaining coverage, capacity and quality of service. Network Operators may determine the permitted impact on coverage, capacity and quality of service decision. Further, by reducing power consumption of the 5G networks it may be possible to minimize negative impact on environment.

Therefore, there is a need in the art to provide systems and methods that can overcome the abovementioned shortcomings of the existing prior art without any coverage or Quality of Service (QoS) loss during the 5G network operation.

OBJECTS OF THE PRESENT DISCLOSURE

Some of the objects of the present disclosure, which at least one embodiment herein satisfies are as listed herein below.

An object of the present disclosure is to provide an efficient and reliable systems and methods for saving energy in a network.

An object of the present disclosure is to provide systems and methods for saving energy using r-Apps and x-Apps in an Open Radio Access Network (O-RAN).

An object of the present disclosure is to enable the RAN architecture to include energy saving feature as a service using r-Apps and x-Apps in a unified manner into the network which can have multi-vendor O-RAN nodes.

An object of the present disclosure is to enable the r-Apps and x-Apps to work across technologies, multiple vendors and types of RAN nodes (Macro, Micro, Pico etc) for saving the energy in the network.

An object of the present disclosure is to guide a cell or a network element or network function using RAN based approach, to activate/de-activate the energy saving mode.

An object of the present disclosure is to enhance overall efficiency of activating/de-activating of the energy saving mode using machine learning techniques to learn dynamic behaviour or network and guide a cell or a network element or network function to activate/de-activate the energy saving mode.

An object of the present disclosure is to enable Long Term Evolution (LTE) and New Radio (NR) based technologies used in mobile network deployment and specially network Architecture which is deployed based on O-RAN architecture, for energy saving in the network.

An object of the present disclosure is to reduce operational expenses through energy saving in a typical O-RAN based network deployment.

An object of the present disclosure is to utilize energy saving policies for yielding more optimizations as compared the traditional energy saving policies.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for saving energy in a heterogenous network. The system may include a network device equipped with a Non-Real Time Radio Intelligent Controller (Non-RT RIC) and communicatively coupled to a Near-Real Time Radio Intelligent Controller (Near-RT RIC). In an embodiment, the network device may be further operatively coupled to a plurality of cells in the heterogenous network, and the plurality of cells including one or more booster cells and one or more candidate cells. Further, the plurality of cells may be communicatively coupled to an open radio access network unit (O-RAN), and each cell may have one or more mobile devices associated with the cell. In yet another embodiment, the network device may further include a processor that may execute a set of executable instructions that may be stored in a memory, upon execution of which, the processor may cause the network device to receive, a set of data packets from the one or more first computing devices pertaining to a set of initial energy saving requirements and further receive, a set of measurements pertaining to an amount of energy consumed by the plurality of cells in the heterogenous network and an amount of traffic associated with the heterogenous network at a predefined time. The set of measurements may be received on execution of a second set of instructions on the Near-RT RIC configured to extract an amount of energy consumed from each E2 node. The E2 interface is a bidirectional interface associated with an open radio access network node and the Near-RT RIC. The O-RAN DU may be associated with the O-RAN unit. The network device may then extract, by a first set of instructions to be executed on the Non-RT RIC, a first set of attributes based on the set of data packets and the set of measurements received. The first set of attributes may pertain to parameters associated with an optimal amount of energy to be saved in each cell of the heterogenous network an increase in the amount of traffic in the heterogenous network beyond a predefined threshold. The network device, may further determine, by a machine learning (ML) engine associated with the network device, an amount of energy to be saved in the heterogenous network based on the first set of attributes extracted and a predetermined energy policy definition, and then based on the amount of energy determined to be saved, the network device may then activate the one or more booster cells to an energy saving mode. Herein, the first set of instructions imply the r-Apps and the second set of instructions imply the x-Apps. The use of the r-Apps and the x-Apps make the energy saving system reliable, efficient and configurable on the go.

In an embodiment, the network device may de-activate the energy saving mode on the one or more capacity booster cells using the second predefined interface once when an optimal energy consumption is reached on candidate cells and when the amount of traffic may goes up the predefined threshold. The network device may further inform one or more neighbouring cells that the energy saving mode has been deactivated. Thus, it is clear that the system can guide a cell or a network element or network function using RAN based approach, to activate/de-activate the energy saving mode, and enhance overall efficiency of activating/de-activating of the energy saving mode using machine learning techniques to learn dynamic behaviour or network and guide a cell or a network element or network function to activate/de-activate the energy saving mode.

In an embodiment, the network device may be further operatively coupled to the one or more mobile devices through the Open radio access network Radio Unit (O-RU). Thus, can have multi-vendor O-RAN nodes and can support different types of RAN nodes such as Macro, Micro, Pico and the like for saving the energy in the network.

In an embodiment, the energy saving mode may include switching off one or more booster cells associated with the plurality of cells for a predefined time period.

In an embodiment, the first set of instructions may be further configured to start a set of energy measurements in the one or more booster cells and the one or more candidate cells irrespective of whether the energy saving mode is switched on or off, wherein the set of energy measurements are stored in a centralized server.

In an embodiment, the first set of instructions may be further configured to transmit the set of energy measurements to the Near-RT RIC on execution of the second set of instructions through a predefined interface.

In an embodiment, the second set of instructions may instruct each E2 interface to start the predefined set of energy measurements to the network device via a second predefined interface.

In an embodiment, each node may further transmit the predefined set of energy measurements to the second set of instructions. The second set of instructions may be further configured to transmit feedback of the predefined set of energy measurements to the first set of instructions via the second predefined interface.

In an embodiment, the ML engine may configure the one or more booster cells in energy saving mode to move the one or more first computing devices and the one or more mobile devices associated with the one or more booster cells to other cells that may be configured to stop receiving new one or more first computing devices (124) and new one or more mobile devices.

In an embodiment, the Near-RT RIC may be coupled to the Open radio access network Distributed Unit (O-DU), the O-DU further may be coupled to an Open radio access network Central Unit Control Plane (O-CU-CP), an Open radio access network Central Unit User Plane (O-CU-UP) and a User Plane Function (UPF).

In an embodiment, the network device (108) may be a System on Chip (SoC) system equipped with a Micro-Services Architecture (MSA) having a plurality of microservices to support portability.

In an embodiment, the network device may be modular and flexible to accommodate any kind of changes.

In an embodiment, the network device may be equipped with an ML based prediction engine configured to predict energy consumption in the heterogenous network. Thus, the system can enable Long Term Evolution (LTE) and New Radio (NR) based technologies used in mobile network deployment and specially network Architecture and further reduce operational expenses through energy saving in a typical O-RAN based network deployment yielding more optimizations as compared the traditional energy saving policies.

In an embodiment, the network device may be remotely monitored.

In an aspect, the present disclosure provides for a network device for saving energy in a heterogenous network. The network device may include a Non-Real Time Radio Intelligent Controller (Non-RT RIC), the Non-RT RIC further communicatively coupled to a Near-Real Time Radio Intelligent Controller (Near-RT RIC) and a processor that may execute a set of executable instructions that are stored in a memory, upon execution of which, the processor may causes the network device to receive, a set of data packets from the one or more first computing devices pertaining to a set of initial energy saving requirements and further receive, a set of measurements pertaining to an amount of energy consumed by the plurality of cells in the heterogenous network and an amount of traffic associated with the heterogenous network at a predefined time. The set of measurements may be received on execution of a second set of instructions on the Near-RT RIC configured to extract an amount of energy consumed from each E2 node. The E2 interface is a bidirectional interface associated with an open radio access network and the Near-RT RIC. The O-RAN DU may be associated with the O-RAN unit. The network device may then extract, by a first set of instructions to be executed on the Non-RT RIC, a first set of attributes based on the set of data packets and the set of measurements received. The first set of attributes may pertain to parameters associated with an optimal amount of energy to be saved in each cell of the heterogenous network and an increase in the amount of traffic in the heterogenous network beyond a predefined threshold. The network device, may further determine, by a machine learning (ML) engine associated with the network device, an amount of energy to be saved in the heterogenous network based on the first set of attributes extracted and a predetermined energy policy definition, and then based on the amount of energy determined to be saved, the network device may then activate the one or more booster cells to an energy saving mode.

In an aspect, the present disclosure provides for a method for saving energy in a heterogenous network. The method may include the steps of receiving, by a network device, a set of data packets from the one or more first computing devices, the set of data packets pertaining to a set of initial energy saving requirements. In an embodiment, the network device may be equipped with a Non-Real Time Radio Intelligent Controller (Non-RT RIC) and communicatively coupled to a Near-Real Time Radio Intelligent Controller (Near-RT RIC), and further operatively coupled to a plurality of cells in the heterogenous network. The plurality of cells may include one or more booster cells and one or more candidate cells. The plurality of cells may be further communicatively coupled to an open radio access network unit (O-RAN), and each cell may have one or more mobile devices associated with it. The method further may include the step of receiving, by the network device, a set of measurements pertaining to an amount of energy consumed by the plurality of cells in the heterogenous network and an amount of traffic associated with the heterogenous network at a predefined time. In an embodiment, the set of measurements may be received on execution of a second set of instructions on a Near-RT RIC configured to extract an amount of energy consumed from each E2 node that may be a bidirectional interface associated with an open radio access network and the Near-RT RIC. The O-RAN DU may be further associated with the O-RAN unit. Further, the method may include the step of extracting, by a first set of instructions to be executed on the Non-RT RIC, a first set of attributes based on the set of data packets and the set of measurements received. The first set of attributes may pertain to parameters associated with an optimal amount of energy to be saved in each cell of the heterogenous network and an increase in the amount of traffic in the heterogenous network beyond a predefined threshold. The method may then include the step of determining, by a machine learning (ML) engine associated with the network device, an amount of energy to be saved in the heterogenous network based on the first set of attributes extracted and a predetermined energy policy definition, and based on the amount of energy determined to be saved, the method may further include the step of switching, by the network device, the one or more booster cells to an energy saving mode.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 2 illustrates an exemplary representation of proposed Service Management and Orchestration (SMO) system/Near Real-Time Radio Access Network (RAN) Intelligent Controller (Near-RT RIC) for saving energy in a network using an Open Radio Access Network (O-RAN), in accordance with an embodiment of the present disclosure.

FIG. 4A illustrates an exemplary flow chart depicting a method for saving energy in a network using an O-RAN by switching off capacity boosting cell, in accordance with an embodiment of the present disclosure.

Figure 1A:
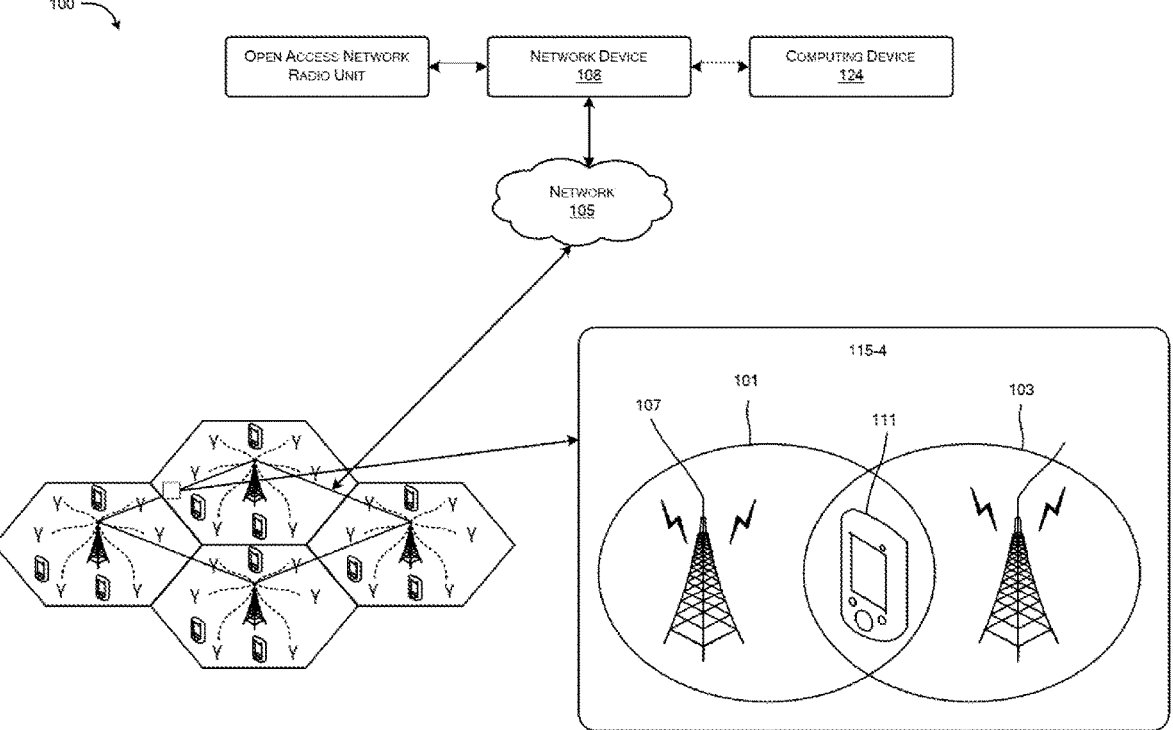
FIG. 1A illustrates an exemplary network architecture in which or with which proposed system of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The term radio access network (RAN) Intelligent controller (RIC) refers to an open RAN Intelligent Controller (RIC) that provides an open hosting platform and is responsible for controlling and optimising the RAN functions. The RIC incorporates artificial intelligence (AI)/machine learning (ML) into its decision-making functionalities and comes in two forms: near real time and non-real time, which can be adapted to specific latency or control loop requirements.

Thus, the Near real-time RIC can control the other RAN elements, including central units (CU)s and distributed units (DU)s, and perform network optimisation actions that can take place between 10 milliseconds to one second. Non-real-time (RT) RIC, a concept developed by the O-RAN alliance, incorporates intelligence into the system design to perform network management tasks and works for control loops of over 1 second. Essentially, Non-RT RIC provides the Near-RT RIC with network and subscriber data, along-side AI based recommendations, whilst the latter provides real-time optimisation.

The present invention provides an efficient and reliable systems and methods for saving energy in a network using Open Radio Access Network (O-RAN). The present disclosure provides systems and methods to enable the O-RAN architecture to include energy saving feature as a service using a first and a second set of instructions in a unified manner into the network which can have multi-vendor O-RAN nodes. The first and the second set of instructions can work across technologies, multiple vendors and types of RAN nodes (Macro, Micro, Pico etc). The present disclosure provides systems and methods to guide a cell or a network element or network function using RAN based approach, to activate/de-activate the energy saving mode. The present disclosure provides systems and methods to enhance overall efficiency of activating/de-activating of the energy saving mode using machine learning techniques to learn dynamic behaviour or network and guide a cell or a network element or network function to activate/de-activate the energy saving mode. The present disclosure provides systems and methods to enable Long Term Evolution (LTE) and New Radio (NR) based technologies used in mobile network deployment and specially network Architecture which is deployed based on O-RAN architecture, for energy saving in the network. The present disclosure provides systems and methods to reduce operational expenses through energy saving in a typical O-RAN based network deployment. Energy saving methods can use machine learning techniques to form the dynamic policies for energy saving. These policies will yield more optimizations as compared the traditional energy saving policies.

FIG. 1A illustrates an exemplary network architecture in which proposed system (100) of the present disclosure can be implemented, in accordance with an embodiment of the present disclosure. FIG. 1A, illustrates a plurality of cells (115-1, 115-2, . . . 115-N) (also referred individually as cell (115) and collectively as cells (115)) operatively coupled to a network device (108) through a heterogenous network (105). For example, a heterogenous network may consist of two or more types of nodes organized into hierarchical clusters. The heterogenous network (or simply referred to as the network (105) herein) may be wireless and wireline and can support 2G, 3G, 4G, LTE, 5G, 6G and other next generation communication services. Each cell (115) may include a base station (117). The base station (117) may include booster power unit to perform boosting up of signal transmission and each such cell may be referred to as booster cell. To explain the working of the plurality of cells (115) more clearly to a person not skilled in the art, a rectangular cross section (115-4) in the plurality of cells (115) is depicted that shows a mobile device (also called a mobile station or MS) (111), a first cell (107), and a second cell (109). The first cell (107) has a first cell region (101) and the second cell (109) has a second cell region (103) in order to offer communication service. The mobile device (111) located in an overlapped area of the first cell region (101) and the second cell region (103) can transmit/receive signals to/from the network (105) through the adjacent cell (107) or (109). When the mobile device (111) is turned on, the mobile device (111) can start a process of cell selection. In the process, if the mobile device (111) receives parameters of the first cell (107), the first cell is the candidate cell. Alternatively, if the mobile device (111) receives parameters of the second cell (109), the second cell becomes the candidate cell.

In an embodiment, whenever traffic in the network (105), for example, number of users in the network increases beyond a predefined limit, the one or more booster cells in the plurality of cells may be activated. A candidate cell may be upgraded to a booster cell, if and when the traffic in the network increases.

Figure 1B:
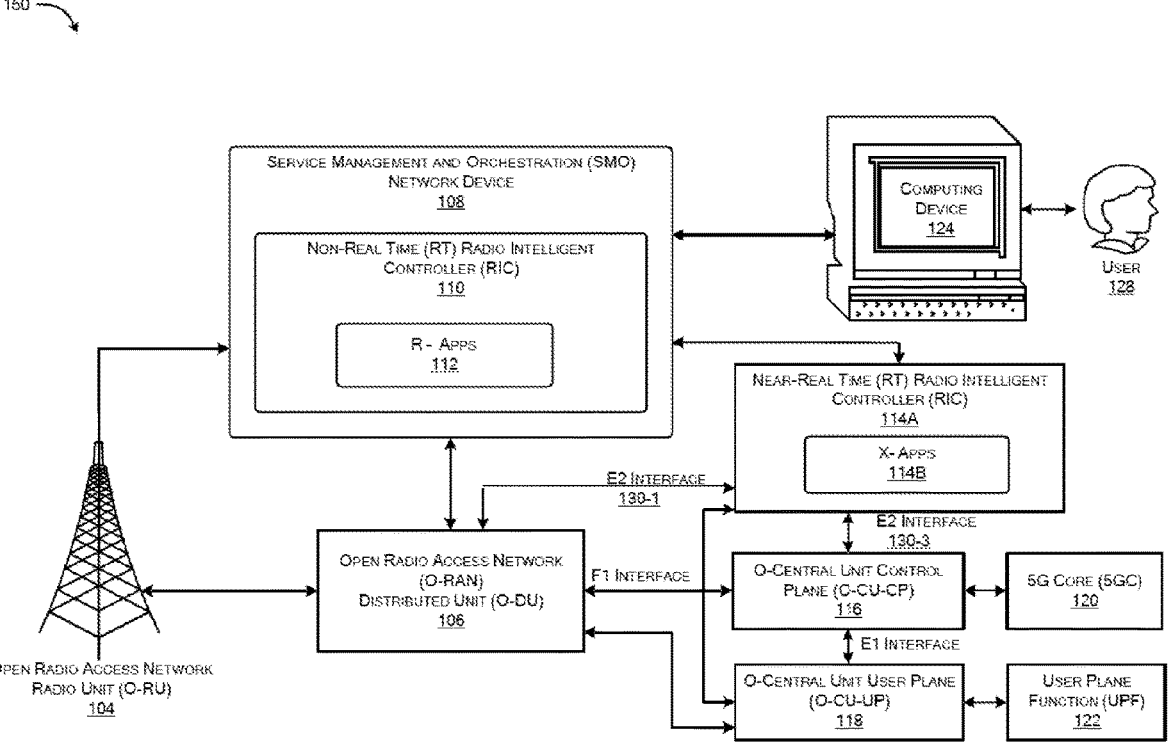
FIG. 1B illustrates a detailed architecture of the network device and associated units in which or with which proposed system of the present disclosure can be implemented, in accordance with an embodiment of the present disclosure.

The network device (108) may be further associated with an open radio access radio unit (O-RU) (104) and one or more first computing devices (124-1, 124-2 . . . 124-N) (individually referred to as the computing device (124) and collectively referred to as the computing devices (124)) which will be thereby explained in FIG. 1B.

Referring to FIG. 1B that illustrates an exemplary detailed architecture (150) of the network device (108) (also referred to as a Service Management and Orchestration (SMO) device (108) or simply referred to as the SMO device (108)) and one or more modules associated with the network device (108) of the present disclosure can be implemented, in accordance with an embodiment of the present disclosure. As illustrated, the network device (108) may be equipped with a Non-Real Time Radio Intelligent Controller (Non-RT RIC) (110), and further operatively coupled to an Near-Real Time Radio Intelligent Controller (Near-RT RIC) (114A) for facilitating energy saving in the network based on a prede-termined energy policy definition received from users (128-1, 128-2, 128-3 . . . 128-N) (individually referred to as the user (128) and collectively referred to as the users (128)) associated with the one or more first computing devices (124). The SMO device (108) may be further operatively coupled to one or more mobile devices (111), via an Open radio access network Radio Unit (O-RU) (104). The SMO (108) may be communicatively coupled to the one or more first computing devices (individually referred to as the first computing device (124) and collectively referred to as the first computing devices (124)).

Further, the Non-RT RIC (110) may include a first set of instructions (also referred to as r-Apps (112) hereinafter) and the Near-RT RIC (114A) may include a second set of instructions (114B) (also referred to as x-Apps (114B) hereinafter). The SMO device (108) and the Near-RT RIC (114A) may be coupled to an Open radio access network Distributed Unit (O-DU) (106). The O-DU (106) may be coupled to an Open radio access network Central Unit Control Plane (O-CU-CP) (116) and the Near-RT RIC (114A) through respective bidirectional interface (130-2), (130-1) (also referred to as E2 interface 130) respectively. The O-DU (106) may be further operatively coupled to an Open radio access network Central Unit User Plane (O-CU-UP) (118) through an F1 interface. The Near-RT RIC (114A)

may also be coupled to the O-CU-CP (116) and the O-CU-UP (118) through another E2 interface (130-3). The O-CU-CP (116) may be coupled to the O-CU-UP (118). Further, the O-CU-CP (116) may be coupled to the Fifth-Generation (5G) Core (5GC) (120) and the O-CU-UP (118) may be coupled to a User Plane Function (UPF) (122).

In an embodiment, a booster cell (interchangeably referred to as capacity boosting cell or a new radio (NR) capacity booster cell) may be switched off for saving energy. The energy saving process may be based on the predetermined energy policy definition such as a centralized energy saving solution proposed in 3GPP TS 28.310 V16.3.0 (2020 December) section 6.2.2 but not limited to it. The user (128) via the first computing device (124) may input initial energy saving policies to "energy saving" r-Apps (112) in non-RT RIC (110). The "energy saving" r-Apps (112) may create policies to start a set of energy measurements in New Radio (NR) capacity booster cells and candidate cell. The r-Apps (112) may transmit policies to x-Apps (114B) in Near-RT RIC (114A) via a predefined interface such as an A1 interface but not limited to it.

In an embodiment, the x-Apps (114B) may instruct the one or more E2 interfaces (130) as shown in FIG. 1, to start the set of energy measurements. The E2 interfaces may transmit the set of energy measurements to SMO system (108) via a second predefined interface such as but not limited to an O1 interface. Further, the E2 interfaces may also transmit reports to the x-Apps (114B). In an embodiment, the x-Apps (114B) may collect reports from the E2 interfaces and may transmit policy feedback to the r-Apps (112) via the A1 interface.

In an embodiment, a Machine Leaning (ML) module (216) (Ref. FIG. 2) may work on measurement data stored in the SMO device (108) and may infer the measurement data. The ML module may transmit feedback to the r-Apps (112). The r-Apps (112) may act on various inputs and may decide to move NR booster cell into energy saving mode. Further, the r-Apps (112) may transmit command to the SMO system (108).

In an embodiment, the SMO device (108) may configure the NR capacity booster cell to enter into energy saving mode. The SMO device (108) may also configure other cells to indicate that the booster cells is moving into energy saving mode. Further, the booster cells may move respective mobile devices (111) to other cells and stop receiving new mobile devices. Once all the mobile devices move to other cells, the booster cell may move to energy saving mode. Further, the booster cells may indicate same to the SMO device (108).

In an embodiment, the SMO device (108) may indicate to the r-Apps (112) that the NR capacity booster cell has moved to energy saving mode. Further, the r-Apps (112) may continue to collect measurements.

In an embodiment, the SMO device (108), the Near-RT RIC (114A) may be a System on Chip (SoC) system but not limited to the like. In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the SMO system (108), and the Near-RT RIC (114A) as proximate processing may be acquired towards energy saving in the network. The SMO device (108), and the Near-RT RIC (114A) configuration details can be modified on the fly.

In an embodiment, the SMO device (108) may be remotely monitored and the data, application and physical security of the SMO device (108) may be fully ensured. In an embodiment, the data may get collected meticulously and deposited in a cloud-based data lake to be processed to extract actionable insights. Therefore, the aspect of predictive maintenance can be accomplished.

In an exemplary embodiment, a communication network (105) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an Internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, a server (not shown in FIG. 1B) may be included in architecture (100). The server may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (124), the one or more mobile devices (111) may communicate with the SMO device (108) via set of executable instructions residing on any operating system, including but not limited to, Android™, iOS™, Kai OS™ and the like. In an embodiment, one or more first computing devices (124) and the one or more mobile devices (111) may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (124), and the one or more mobile devices may not be restricted to the mentioned devices and various other devices may be used. A smart computing device may be one of the appropriate systems for storing data and other private/sensitive information.

FIG. 2 illustrates an exemplary representation of the proposed Service Management and Orchestration (SMO) device (108) for energy saving in a network using an Open-RAN (O-RAN), in accordance with an embodiment of the present disclosure. In an aspect, the SMO device (108) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the SMO system (108). The memory (204) may store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the SMO device may include an interface(s) 206. The interface(s) (206) may include a variety of interfaces, for example, interfaces for data input and output devices, referred to as I/O devices, storage devices, and the like. The interface(s) (206) may facilitate communication of the SMO system (108). The interface(s) (206) may also provide a communication pathway for one or more components of the SMO system (108). Examples of such components may include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the SMO device (108) may comprise the machine-readable storage medium storing the instructions and the processing resource to execute the instructions, or the machine-readable storage medium may be separate but accessible to the SMO device (108) and the processing resource. In other examples, the processing engine(s) (208) may be implemented by electronic circuitry. Further, the SMO device (108) may include Machine Learning (ML) modules.

The processing engine (208) may include one or more engines selected from any of a data acquisition engine (212), signal acquisition engine (214), a machine learning engine (216), a prediction engine (218) and other engines (220). The processing engine (208) may further edge based micro service event processing but not limited to the like.

In an embodiment, the data acquisition engine (212) and the signal acquisition engine (214) may receive, a set of data packets from the one or more first computing devices (124) pertaining to a set of initial energy saving requirements and receive, a set of measurements pertaining to an amount of energy consumed by the plurality of cells (115) and an amount of traffic associated with the heterogenous network (105) at a predefined time. In an embodiment, the set of measurements is received on execution of a second set of instructions (114B) on the Near-RT RIC (114A) configured to extract an amount of energy consumed from each E2 interface, wherein each said E2 interface (130) is a bidirectional interface associated with an open radio access network and the Near-RT RIC) (114A).

In another embodiment, the ML engine extract a first set of attributes based on the set of data packets and the set of measurements received. The first set of attributes may pertain to parameters associated with an optimal amount of energy to be saved in each cell of the heterogenous network (105) and an increase in the amount of traffic in the heterogenous network beyond a predefined threshold. The ML engine (216) may further determine an amount of energy to be saved in the heterogenous network (105) based on the first set of attributes extracted and a predetermined energy policy definition and based on the amount of energy determined to be saved, the ML engine (216) may then activate the one or more booster cells to an energy saving mode. The ML engine may further start a set of energy measurements in the one or more booster cells and the one or more candidate cells irrespective of whether the energy saving mode is switched on or off and then transmit the set of energy measurements to the Near-RT RIC (114A) on execution of the second set of instructions (114A) through a predefined interface.

In an embodiment, the ML engine may perform a second set of instructions (114B) that may instruct each E2 interface (130) to start the predefined set of energy measurements, and thus each E2 interface transmits the set of predefined energy measurements to the network device (108) via a second predefined interface. The E2 interface (130) further transmits the predefined set of energy measurements to the second set of instructions (114A) The ML engine (216) may further configure the second set of instructions (114B) further is configured to transmit feedback of the predefined set of energy measurements to the first set of instructions (112) via the second predefined interface.

In an embodiment, the ML engine (216) may further configure the one or more booster cells in energy saving mode to move the one or more first computing devices (124) and the one or more mobile devices associated with the one or more booster cells to other cells. The ML engine (216) may further configure the one or more booster cells to stop receiving new one or more first computing devices (124) and new one or more mobile devices.

In an embodiment, the prediction engine (218) may be configured to predict energy consumption in the heterogenous network (105) and further deactivate the energy saving mode on the one or more capacity booster cells using the second predefined interface once when the amount of traffic associated with the heterogenous network increases above the predefined threshold. The prediction engine (218) may be further configured to inform one or more neighbouring cells that the energy saving mode has been deactivated.

Figure 3:
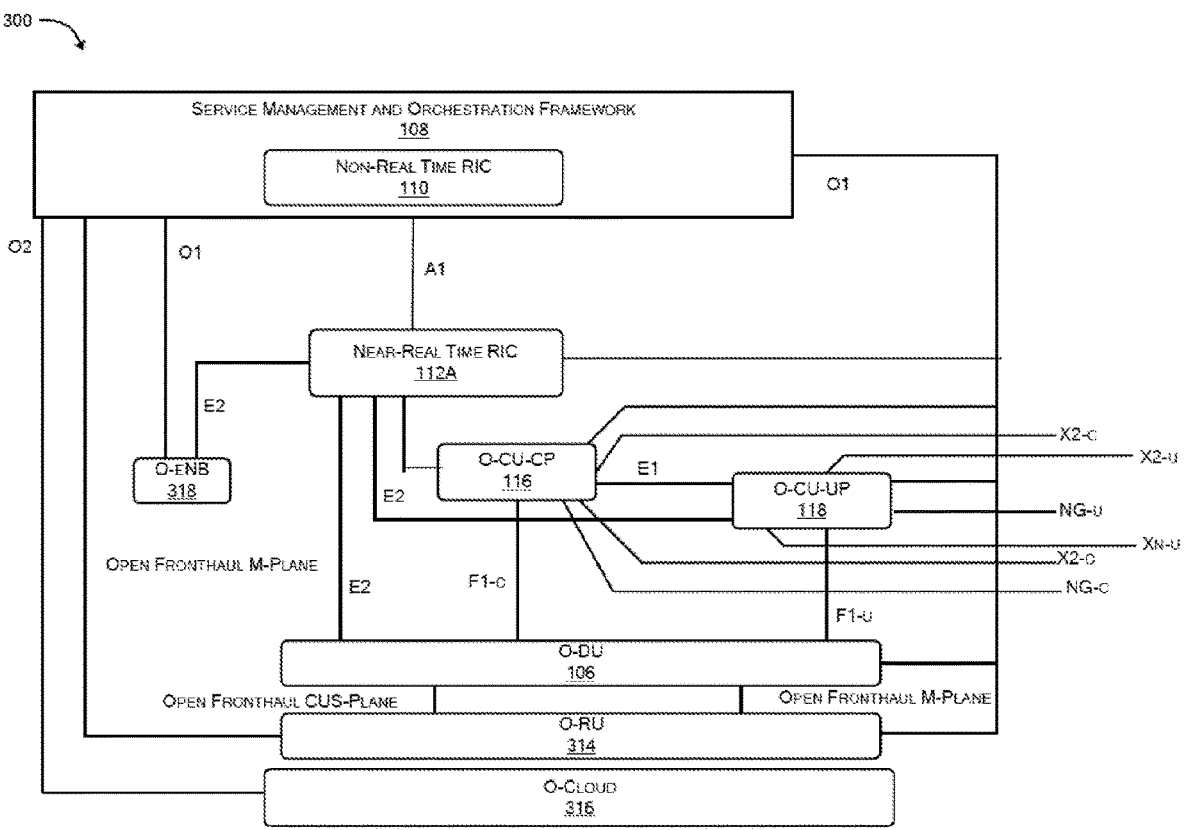
FIG. 3 illustrates an exemplary block diagram representation of a system architecture, in accordance with an embodiment of the present disclosure.

FIG. 3 illustrates an exemplary block diagram representation of a system architecture (300), in accordance with an embodiment of the present disclosure.

The system architecture (300) is an O-RAN architecture. The r-Apps (112) may have an interface where external information can be fed to the Operator network. The Near-RT RIC (114A) may be a logical function that enables near-real-time control and optimization of RAN elements and resources via fine-grained data collection and actions over E2 interface (130), as shown in FIG. 3. The Near-RT RIC (114A) may include Artificial Intelligence (AI)/Machine Learning (ML) workflow including model training, inference and updates which are handled by the x-Apps (114B).

Further, the Non-RT RIC (110) may include a logical function within Service Management and Orchestration system (SMO) (108), that may drive the content carried across the A1 interface, as shown in FIG. 3. The Non-RT RIC (110) may include a Non-RT RIC Framework and the Non-RT RIC Applications such as the r-Apps (112). Furthermore, the Non-RT RIC framework, may function internal to the SMO (108), that logically terminates the A1 interface to the Near-RT RIC (114A) and may expose set of internal SMO services needed for their runtime processing, to the r-Apps (112), via a R1 interface. The Non-RT RIC framework may function within the non-RT RIC (110) and may provide AI/ML workflow including model training, inference and updates needed for r-Apps (112).

Further, O1 interface from the O-RAN components may terminate at the SMO (108). The O-CU-CP (116) may be a logical node hosting the RRC and the control plane part of the PDCP protocol. Further, an O-CU-UP (118) may be a logical node hosting the user plane part of the PDCP protocol and the SDAP protocol. An O-DU (106) may be a logical node hosting Radio Link Control (RLC)/Medium Access Control (MAC)/High-Physical (PHY) layers based on a lower layer functional split. The E2 interface is a logical node terminating E2 interface. Further, a O-RAN nodes may be terminating at an F1 interface that are, for NR access, O-CU-CP (116), O-CU-UP (118), O-DU (106) or any combination, and for E-UTRA access such as O-eNB (318). The Non-RT RIC applications such as r-Apps (112) may be a modular application that leverage the functionality exposed via the R1 interface of the non-RT RIC framework, to provide added value services relative to RAN operation. The added value services relative to RAN operation includes, but not limited to, driving the A1 interface, recommending values and actions that may be subsequently applied over the O1/O2 interface and generating "enrichment information" for the use of other r-Apps (112), and the like. The r-Apps (112) may function within the non-RT RIC (304) that enables non-real-time control and optimization of RAN elements and resources and policy-based guidance to the applications/features in the Near-RT RIC (114A). Further, the Near-RT RIC applications such as x-App (114B) may run on the Near-RT RIC (114A). Such application may be likely to consist of one or more microservices and at the point of on-boarding may identify which data it consumes and which data it provides. The application is independent of the Near-RT RIC (114A) and may be provided by any third party. The E2 enables a direct association between the x-Apps (114B) and the RAN functionality.

Further, a O-Cloud (316) may be a cloud computing platform which includes a collection of physical infrastructure nodes that meet O-RAN requirements to host the relevant O-RAN functions of the Near-RT RIC (114A), the O-CU-CP (116), the O-CU-UP (118), and the O-DU (106), the supporting software components (such as Operating System, Virtual Machine Monitor, Container Runtime, etc.) and the appropriate management and orchestration functions. In addition, O1 interface may be between SMO framework and O-RAN managed elements, for operation and management, by which may be Fault, Configuration, Accounting, Performance, Security, (FCAPS) management, Physical Network Function (PNF) software management, file management may be achieved. Further, O2 interface may be between the SMO framework and the O-Cloud (316) for supporting O-RAN virtual network functions. Furthermore, A1 interface between the non-RT RIC (110) and the Near-RT RIC (114A). The purpose of the A1 interface may be to enable the non-RT RIC function to provide policy-based guidance, ML model management and enrichment information to the Near-RT RIC function so that the RAN can optimize e.g., Radio Resource Management (RRM) under certain conditions. Thereafter, the E2 interface may be to connect the Near-RT RIC (114A) and one or more O-CU-CPs (116), one or more O-CU-UPs (118), and one or more O-DUs (106). The R1 interface may be between the r-Apps (112) and the non-RT RIC framework. The energy saving policies may be formed, modified and deleted in r-Apps (112) using inputs from user (128) via the first computing device (124), machined learned algorithms and feedback from x-Apps (114B). The energy saving x-Apps (114B) may collect measurement data from E2 interfaces, executes policies formed by r-Apps (112) and send feedback back to r-Apps (112). The r-Apps (112) may use O1 interface from the SMO device (108) to push configurations related to energy saving to E2 interfaces.

FIG. 4A illustrates an exemplary flow chart depicting a method for saving energy in a network using an O-RAN by switching off capacity boosting cell, in accordance with an embodiment of the present disclosure.

At block (402), the method (400a) may include receiving, by the processor (202), energy saving policies via r-Apps (112). At block (404), the method (400a) may include instructing, by the processor (202), via r-Apps (112) to x-Apps (114B) to start measurements. At block (406), the method (400a) may include subscribing, by the processor (202), via x-Apps (114B) to E2 interfaces to start measurements. At block (408), the method (400a) may include generating, by the processor (202), via E2 interfaces, E2 reports and O1 events according to x-Apps (114B) subscriptions. At block (410), the method (400a) may include collecting, by the processor (202), via the x-Apps (114B), reports from E2 interfaces and send feedback to r-Apps (112). At block (412), the method (400a) may include collecting, by the processor (202), via the r-Apps (112), feedback and/or events. At block (414), the method (400a) may include enabling, by the processor (202), via the r-Apps (112) energy saving turned on for capacity boosting cell, based on inputs. At block (416), the method (400a) may include instructing, by the processor (202), via r-Apps (112) SMO device (108) to execute the decision of enabling the energy saving mode. At block (418), the method (400a) may include moving, by the processor (202), using O1 interface, via the SMO device (108), capacity boosting cell in to energy saving mode and indicating same to other cells. At block (420), the method (400a) may include continuing, by the processor (202), measurements to evaluate the decision.

Figure 4B:
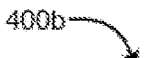
FIG. 4B illustrates an exemplary flow chart depicting a method for de-activating energy saving mode on capacity boosting cell that is in energy saving mode, in accordance with an embodiment of the present disclosure.
Figure 4B:
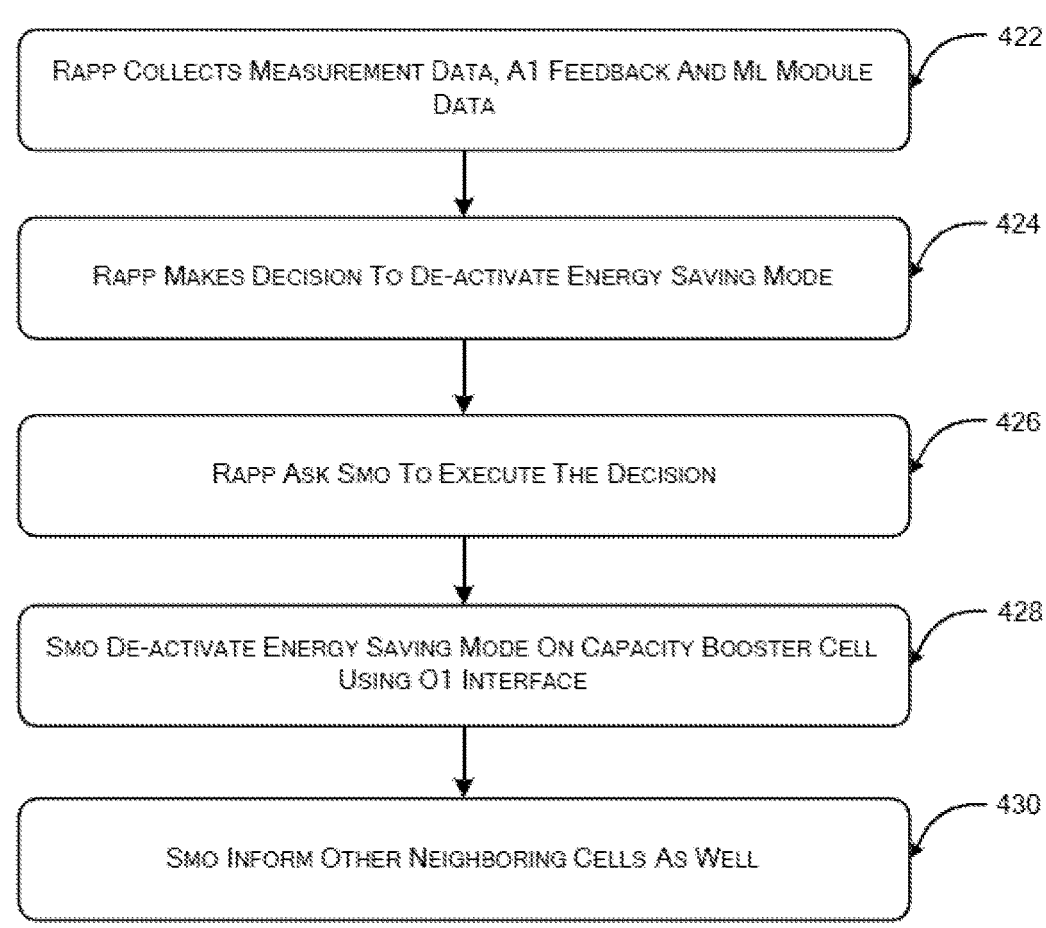

FIG. 4B illustrates an exemplary flow chart depicting a method for de-activating energy saving mode on capacity boosting cell that is in energy saving mode, in accordance with an embodiment of the present disclosure.

At block (422), the method (400b) may include collecting, by the processor (202), via r-Apps (112) measurement data, A1 feedback and Machine Learning (ML) module data. At block (424), the method (400b) may include deciding, by the processor (202), via the r-Apps (112), to de-activate energy saving mode. At block (426), the method (400b) may include, obtaining, by the processor (202), via the r-Apps (112), to the SMO device (108), to execute the decision. At block (428), the method (400b) may include, de-activating, by the processor (202), via the SMO device (108), the energy saving mode on capacity boosting cell using O1 interface. At block (430), the method (400b) may include, informing, by the processor (202), via the SMO device (108) to other neighbouring cells.

Figure 5A:
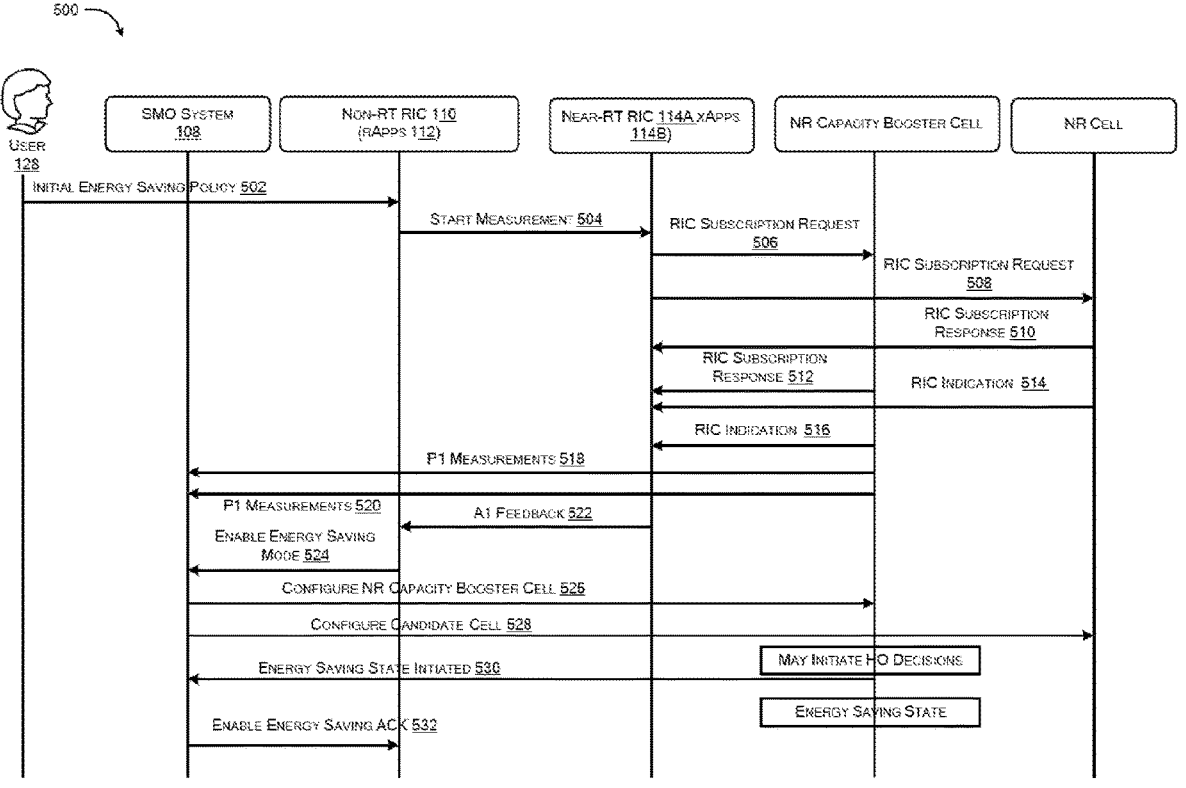
FIG. 5A illustrates a sequence diagram representation of centralized energy saving de-activation for an over laid NR capacity booster cell, in accordance with an embodiment of the present disclosure.

FIG. 5A illustrates a sequence diagram (500A) representation of centralized energy saving activation for an over laid NR capacity booster cell, in accordance with an embodiment of the present disclosure.

At step (502), user (128) may input initial energy saving policies to "energy saving" r-Apps (112) in non-RT RIC (110). The energy saving r-Apps (112) of the non-RT RIC (110), may create policies to start measurements in NR capacity booster cells and candidate cells. At step (504), the r-Apps (112) of the non-RT RIC (110) may transmit policies to x-Apps (124B) in Near-RT RIC (114A). At steps (506), (508), (510), the x-Apps (114B) may instruct E2 interfaces to start appropriate measurements. At steps (512), (514), (516) the E2 interfaces may also transmit reports to x-Apps (114B). At steps (518), (520), the E2 interfaces may transmit measurements to SMO device (108) via O1 interface. The x-Apps (114B) may collect reports from the E2 interfaces and transmit policy to the r-Apps (112) of the non-RT RIC (110) via an A1 interface.

The ML modules may work on measurements data stored in SMO device (108) and may infer the measurements data. At step (522), the ML modules of the x-Apps (114B) may transmit feedback to the r-Apps (112) of the non-RT RIC (110). The r-Apps (112) may act on various inputs and decide to move the New Radio (NR) booster cell into energy saving mode. At step (524), the r-Apps (112) may transmit command to the SMO device (108).

At step (526), the SMO device (108) may configure NR capacity booster cell to enter into energy saving mode. At step (528), the SMO device (108) may also configure other cells to indicate that NR capacity booster cells is moving into energy saving mode. At step (530), the NR capacity booster cells might move associated mobile devices to other cells and stop taking new registration of mobile devices. Once all the mobile devices move to other cells, NR capacity cell may move to energy saving mode. The NR capacity booster cells may indicate the energy saving mode to the SMO device (108). At step (532), the SMO device (108) may indicate to r-Apps (112) that NR capacity booster cell moved to energy saving mode. The x-Apps (114B) of the Near-RT RIC (114A) may gather required information and send feedback to non-RT RIC (110) via A1 interface. The r-Apps (112) may continue to collect measurements.

Figure 5B:
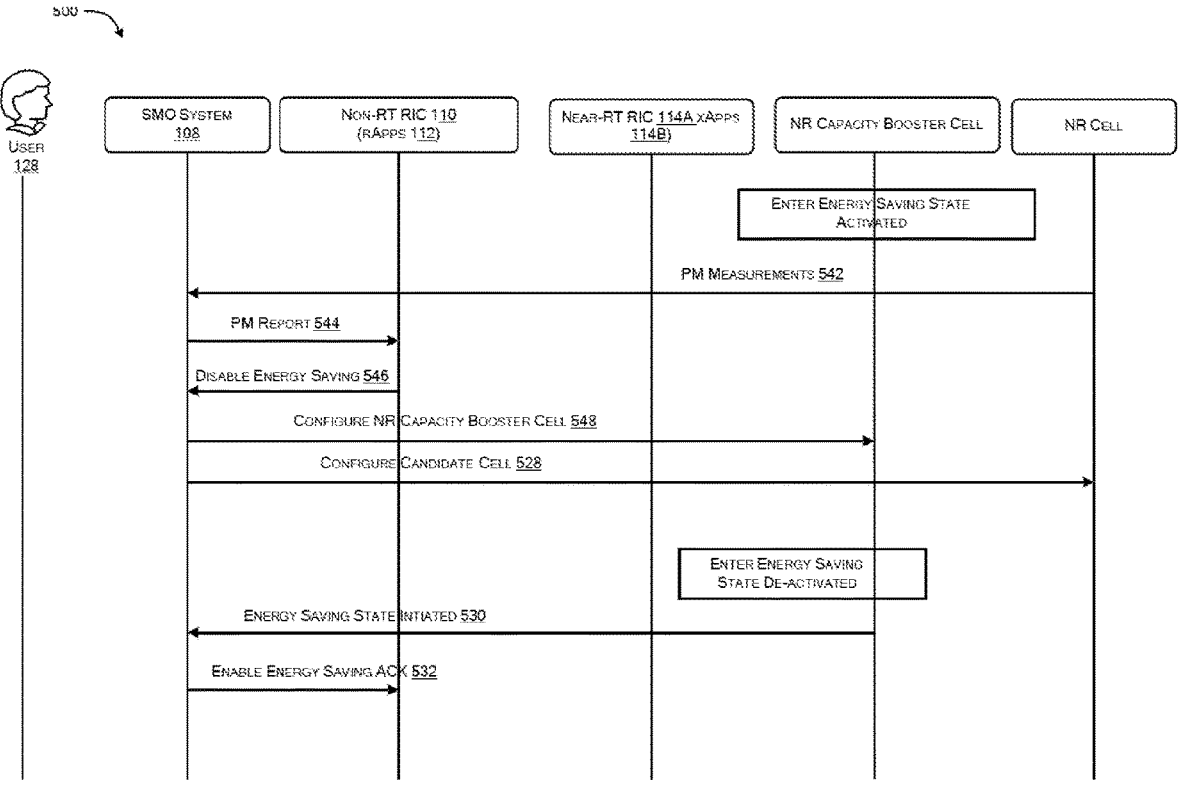
FIG. 5B illustrates a sequence diagram representation of centralized energy saving activation for an over laid New Radio (NR) capacity booster cell, in accordance with an embodiment of the present disclosure.

FIG. 5B illustrates a sequence diagram representation of centralized energy saving de-activation for an over laid New Radio (NR) capacity booster cell, in accordance with an embodiment of the present disclosure.

At steps (542), (544), the "energy saving" r-Apps (112) may continuously monitor measurement report and inputs from Machine Leaning (ML) modules, when load on candidate cells is more, "energy saving" r-Apps (112) may take decision to switch-on the NR capacity booster cell.

At step (546), the r-Apps (112) may transmit information to the SMO device (108) to disable energy saving on NR Capacity booster cell. At step (548), the SMO device (108) may transmit configuration information to NR capacity booster cell to disable energy saving mode. At step (550), the SMO device (108) may also configure others cells to indicate the NR capacity booster cells is ready to take traffic. At step (552), the NR capacity booster cell may disable energy saving mode and indicate same back to the SMO device (108). At step (554), the SMO device (108) may transmit information to the r-Apps (112) that energy saving mode on NR capacity booster cell is disabled. The r-Apps (112) may be monitoring NR cells.

Figure 6:
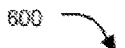
FIG. 6 illustrates an exemplary computer system in which or with which embodiments of the present invention can be utilized, in accordance with embodiments of the present disclosure.
Figure 6:
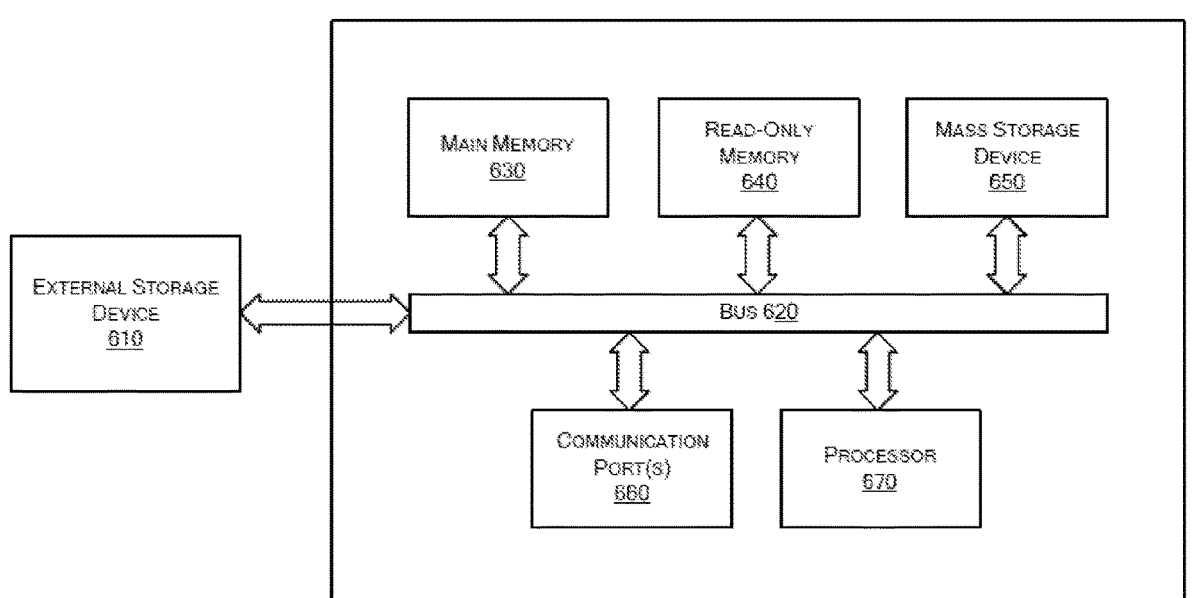

FIG. 6 illustrates an exemplary computer system in which or with which embodiments of the present invention can be utilized in accordance with embodiments of the present disclosure. As shown in FIG. 6, computer system (600) can include an external storage device (610), a bus (620), a main memory (630), a read only memory 640, a mass storage device (650), communication port (660), and a processor (670). A person skilled in the art will appreciate that the computer system may include more than one processor and communication ports. Examples of processor (670) include, but are not limited to, an Intel® Itanium® or Itanium 2 processor(s), or AMD® Opteron® or Athlon MP® processor(s), Motorola® lines of processors, FortisBC™ system on chip processors or other future processors. Processor (670) may include various modules associated with embodiments of the present invention. Communication port (660) can be any of an RS-232 port for use with a modem-based dialup connection, a 10/100 Ethernet port, a Gigabit or 10 Gigabit port using copper or fibre, a serial port, a parallel port, or other existing or future ports. Communication port (660) may be chosen depending on a network, such a Local Area Network (LAN), Wide Area Network (WAN), or any network to which computer system connects. Memory (630) can be Random Access Memory (RAM), or any other dynamic storage device commonly known in the art. Read-only memory (640) can be any static storage device(s) e.g., but not limited to, a Programmable Read Only Memory (PROM) chips for storing static information e.g., start-up or BIOS instructions for processor 670. Mass storage (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Desk star 13K800), one or more optical discs, Redundant Array of Independent Disks (RAID) storage, e.g. an array of disks (e.g., SATA arrays), available from various vendors including Dot Hill Systems Corp., LaCie, Nelsan Technologies, Inc. and Enhance Technology, Inc.

Bus (620) communicatively couples' processor(s) (670) with the other memory, storage and communication blocks. Bus (620) can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (670) to software system.

Optionally, operator and administrative interfaces, e.g., a display, keyboard, and a cursor control device, may also be coupled to bus (620) to support direct operator interaction with a computer system. Other operator and administrative interfaces can be provided through network connections connected through communication port (660). The external storage device (610) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides an efficient and reliable systems and methods for saving energy in a network using Open Radio Access Network (O-RAN).

The present disclosure provides systems and methods to enable the RAN architecture to include energy saving feature as a service using r-Apps and x-Apps in a unified manner into the network which can have multi-vendor O-RAN nodes. Such r-Apps and x-Apps can work across technologies, multiple vendors and types of RAN nodes (Macro, Micro, Pico etc).

The present disclosure provides systems and methods to guide a cell or a network element or network function using RAN based approach, to activate/de-activate the energy saving mode.

The present disclosure provides systems and methods to enhance overall efficiency of activating/de-activating of the energy saving mode using machine learning techniques to learn dynamic behaviour or network and guide a cell or a network element or network function to activate/de-activate the energy saving mode.

The present disclosure provides systems and methods to enable Long Term Evolution (LTE) and New Radio (NR) based technologies used in mobile network deployment and specially network Architecture which is deployed based on O-RAN architecture, for energy saving in the network.

The present disclosure provides systems and methods to reduce operational expenses through energy saving in a typical O-RAN based network deployment. Energy saving methods can use machine learning techniques to form the dynamic policies for energy saving. These policies will yield more optimizations as compared the traditional energy saving policies.

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 21.801.

I claim:

1. A system for saving energy in a heterogenous network, said system comprising:
    a network device equipped with a Non-Real Time Radio Intelligent Controller (Non-RT RIC) and communicatively coupled to a Near-Real Time Radio Intelligent Controller (Near-RT RIC),
        wherein the network device is further operatively coupled to a plurality of cells in the heterogenous network, the plurality of cells comprising one or more booster cells and one or more candidate cells, the plurality of cells further communicatively coupled to an open radio access network unit (O-RAN), each said cell having one or more mobile devices associated with said cell;
    wherein said network device further comprises a processor that executes a set of executable instructions that are stored in a memory, upon execution of which, the processor causes the network device to:
        receive, a set of data packets from one or more first computing devices, said set of data packets pertaining to a set of initial energy saving requirements;
        receive, a set of measurements pertaining to an amount of energy consumed by the plurality of cells and an amount of traffic associated with the heterogenous network at a predefined time, wherein the set of measurements is received on execution of a second set of instructions on the Near-RT RIC configured to extract an amount of energy consumed from each emulated (E2) node, wherein each E2 interface is a bidirectional interface associated with an open radio access network and the Near-RT RIC, wherein an open radio access network distributed unit (O-DU) is further associated with the O-RAN unit;
        extract, by a first set of instructions to be executed on the Non-RT RIC, a first set of attributes based on the set of data packets and the set of measurements received, the first set of attributes pertaining to parameters associated with an optimal amount of energy to be saved in each cell of the heterogenous network and an increase in the amount of traffic in the heterogenous network beyond a predefined threshold;
        determine, by a machine learning engine associated with the network device, an amount of energy to be saved in the heterogenous network based on the first set of attributes extracted and a predetermined energy policy definition; and
        based on the amount of energy determined to be saved, activate the one or more booster cells to an energy saving mode,
        wherein the first set of instructions are configured to create policies to start a set of energy measurements in the one or more booster cells and the one or more candidate cells irrespective of whether the energy saving mode is switched on or off, wherein the set of energy measurements are stored in a centralized server, and
        wherein the first set of instructions are further configured to transmit the created policies to start the set of energy measurements to the Near-RT RIC on execution of the second set of instructions through a predefined interface.

2. The system as claimed in claim 1, wherein the network device is further operatively coupled to the one or more mobile devices through an Open radio access network Radio Unit (O-RU).

3. The system as claimed in claim 1, wherein the energy saving mode comprises switching off one or more booster cells associated with the plurality of cells for a predefined time period.

4. The system as claimed in claim 1, wherein the second set of instructions instructs each said E2 interface to start the set of energy measurements, wherein each said E2 interface transmits the set of energy measurements to the network device via a second predefined interface.

5. The system as claimed in claim 4, wherein each said E2 interface further transmits the set of energy measurements to the second set of instructions, wherein the second set of instructions further is configured to transmit feedback of the set of energy measurements to the first set of instructions via the second predefined interface.

6. The system as claimed in claim 1, wherein the ML engine configures the one or more booster cells in the energy saving mode to move the one or more first computing devices and the one or more mobile devices associated with the one or more booster cells to other cells, wherein the one or more booster cells are configured to stop receiving new one or more first computing devices and new one or more mobile devices.

7. The system as claimed in claim 1, wherein the Near-RT RIC is coupled to the Open radio access network Distributed Unit (O-DU), wherein the O-DU further coupled to an Open radio access network Central Unit Control Plane (O-CU-CP) and an Open radio access network Central Unit User Plane (O-CU-UP) and a User Plane Function (UPF).

8. The system as claimed in claim 1, wherein the network device is a System on Chip (SoC) system equipped with a Micro-Services Architecture (MSA) having a plurality of microservices to support portability.

9. The system as claimed in claim 1, wherein the network device is modular and flexible to accommodate any kind of changes.

10. The system as claimed in claim 1, wherein the network device is equipped with an ML based prediction engine configured to predict energy consumption in the heterogenous network.

11. The system as claimed in claim 1, wherein the network device is remotely monitored.

12. The system as claimed in claim 1, wherein the network device de-activates the energy saving mode on the one or more capacity booster cells using the second predefined interface once when the amount of traffic associated with the heterogenous network increases above the predefined threshold, wherein the network device further informs one or more neighboring cells that the energy saving mode has been deactivated.

13. A network device for saving energy in a heterogenous network, said network device comprising:

a Non-Real Time Radio Intelligent Controller (Non-RT RIC), the Non-RT RIC further communicatively coupled to a Near-Real Time Radio Intelligent Controller (Near-RT RIC), a processor, said processor executes a set of executable instructions that are stored in a memory, upon execution of which, the processor causes the network device to:

receive, a set of data packets from one or more first computing devices, said set of data packets pertaining to a set of initial energy saving requirements, wherein the one or more computing devices are associated with a plurality of cells in the heterogenous network, the plurality of cells is further operatively coupled to the network device, said plurality of cells comprising one or more booster cells and one or more candidate cells, wherein the plurality of cells is further communicatively coupled to an open radio access network unit (O-RAN), each said cell having one or more mobile devices associated with said cell;

receive, a set of measurements pertaining to an amount of energy consumed by the plurality of cells in the heterogenous network and an amount of traffic in the heterogenous network at a predefined time, wherein the set of measurements is received on execution of a second set of instructions on the Near-RT RIC configured to extract an amount of energy consumed from each emulated (E2) node, wherein each E2 interface is a bidirectional interface associated with an open radio access network and the Near-RT RIC, wherein an open radio access network distributed unit (O-DU) is further associated with the O-RAN unit;

extract, by a first set of instructions to be executed on the Non-RT RIC, a first set of attributes based on the set of data packets and the set of measurements received, the first set of attributes pertaining to parameters associated with an optimal amount of energy to be saved in each cell of the heterogenous network and an increase in the amount of traffic in the heterogenous network beyond a predefined threshold;

determine, by a machine learning (ML) engine associated with the network device, an amount of energy to be saved in the heterogenous network based on the first set of attributes extracted and a predetermined energy policy definition; and based on the amount of energy determined to be saved, activate the one or more booster cells to an energy saving mode, wherein the first set of instructions are configured to create policies to start a set of energy measurements in the one or more booster cells and the one or more candidate cells irrespective of whether the energy saving mode is switched on or off, wherein the set of energy measurements are stored in a centralized server, and wherein the first set of instructions are further configured to transmit the created policies to start the set of energy measurements to the Near-RT RIC on execution of the second set of instructions through a predefined interface.

14. The network device as claimed in claim 13, wherein the ML engine configures the one or more booster cells in the energy saving mode to move the one or more first computing devices and the one or more mobile devices associated with the one or more booster cells to other cells, wherein the one or more booster cells are configured to stop receiving new one or more first computing devices and new one or more mobile devices.

15. A method for saving energy in a heterogenous network, said method comprising:

receiving, by a network device, a set of data packets from one or more first computing devices, said set of data packets pertaining to a set of initial energy saving requirements, wherein the network device is equipped with a Non-Real Time Radio Intelligent Controller (Non-RT RIC) and communicatively coupled to a Near-Real Time Radio Intelligent Controller (Near-RT RIC), wherein the network device is further operatively coupled to a plurality of cells in the heterogenous network, the plurality of cells comprising one or more booster cells and one or more candidate cells, the plurality of cells further communicatively coupled to an open radio access network unit (O-RAN), each said cell having one or more mobile devices associated with said cell;

receiving, by the network device, a set of measurements pertaining to an amount of energy consumed by the plurality of cells in the heterogenous network and an amount of traffic in the heterogenous network at a predefined time, wherein the set of measurements are received on execution of a second set of instructions on a Near-RT RIC) configured to extract an amount of energy consumed from each E2 interface, wherein each said E2 interface is a bidirectional interface associated with an open radio access network distributed and the Near-RT RIC, wherein an open radio access network distributed unit (O-DU) is further associated with the O-RAN unit;

extracting, by a first set of instructions to be executed on the Non-RT RIC, a first set of attributes based on the set of data packets and the set of measurements received, the first set of attributes pertaining to parameters associated with an optimal amount of energy to be saved in each cell of the heterogenous network and an increase in the amount of traffic in the heterogenous network beyond a predefined threshold;

determining, by a machine learning (ML) engine associated with the network device, an amount of energy to be saved in the heterogenous network based on the first set of attributes extracted and a predetermined energy policy definition; and based on the amount of energy determined to be saved, switching, by the network device, the one or more booster cells to an energy saving mode, wherein the first set of instructions are configured to create policies to start a set of energy measurements in the one or more booster cells and the one or more candidate cells irrespective of whether the energy saving mode is switched on or off, wherein the set of energy measurements are stored in a centralized server, and wherein the first set of instructions are further configured to transmit the created policies to start the set of energy measurements to the Near-RT RIC on execution of the second set of instructions through a predefined interface.

16. The method as claimed in claim 15, wherein the method further comprises:

switching off one or more booster cells associated with the plurality of cells for a predefined time period during the energy saving mode.

17. The system as claimed in claim 1, wherein the processor further causes the network device to:

upgrade a candidate cell from the one or more candidate cells to a booster cell upon determining that the amount of traffic in the heterogenous network has increased beyond a second predefined threshold.

18. The system as claimed in claim 1, further comprising:

a cloud-based data lake, communicatively coupled to the network device, wherein the processor further causes the network device to deposit the set of measurements and the set of data packets into the cloud-based data lake, and wherein the ML engine is further configured to process data in the cloud-based data lake to perform predictive maintenance for the heterogenous network.

19. The method as claimed in claim 15, further comprising:

upgrading a candidate cell from the one or more candidate cells to a booster cell upon determining that the amount of traffic in the heterogenous network has increased beyond a second predefined threshold.

20. The method as claimed in claim 15, further comprising:

depositing the set of measurements and the set of data packets into a cloud-based data lake; and processing, by the ML engine, data in the cloud-based data lake to perform predictive maintenance for the heterogenous network.

* * * * *